(12) United States Patent
Buehler et al.

(10) Patent No.: US 9,015,673 B2
(45) Date of Patent: Apr. 21, 2015

(54) METHOD FOR DEVELOPING SOFTWARE IN A PARALLEL COMPUTING ENVIRONMENT

(75) Inventors: Eric Daniel Buehler, Grand Rapids, MI (US); Benjamin Thomas Occhipinti, Grand Rapids, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 356 days.

(21) Appl. No.: 13/588,485

(22) Filed: Aug. 17, 2012

(65) Prior Publication Data

US 2014/0053137 A1 Feb. 20, 2014

(51) Int. Cl.
G06F 9/44 (2006.01)

(52) U.S. Cl.
CPC ... G06F 8/10 (2013.01); G06F 8/20 (2013.01)

(58) Field of Classification Search
USPC .......................................................... 717/126
See application file for complete search history.

(56) References Cited

U.S. PATENT DOCUMENTS

| | | | | |
|---|---|---|---|---|
| 7,089,534 B2* | 8/2006 | Hartman et al. | ............... | 717/125 |
| 7,174,536 B1* | 2/2007 | Kothari et al. | ................. | 717/109 |
| 7,926,046 B2* | 4/2011 | Halambi et al. | ............... | 717/151 |
| 8,060,879 B2* | 11/2011 | Shavit et al. | ................... | 718/102 |
| 8,132,153 B2* | 3/2012 | Subramanyam | ............... | 717/121 |
| 8,234,621 B2* | 7/2012 | Killisperger et al. | ......... | 717/101 |
| 8,413,122 B2* | 4/2013 | Dragicevic et al. | ........... | 717/128 |
| 8,533,676 B2* | 9/2013 | Watters et al. | ................. | 717/120 |
| 8,745,585 B2* | 6/2014 | Watters et al. | ................. | 717/121 |
| 2003/0208351 A1* | 11/2003 | Hartman et al. | ................. | 703/22 |
| 2004/0172626 A1* | 9/2004 | Jalan et al. | ..................... | 717/149 |
| 2008/0005112 A1* | 1/2008 | Shavit et al. | ....................... | 707/8 |
| 2008/0282228 A1 | 11/2008 | Subramanyam | | |
| 2010/0205484 A1* | 8/2010 | Dragicevic et al. | ............. | 714/37 |
| 2011/0078670 A1* | 3/2011 | Viry | .............................. | 717/149 |
| 2011/0239201 A1* | 9/2011 | Vaidya et al. | ................. | 717/149 |
| 2012/0246662 A1* | 9/2012 | Vechev et al. | ................. | 718/107 |
| 2013/0174117 A1* | 7/2013 | Watters et al. | ................. | 717/106 |
| 2013/0174122 A1* | 7/2013 | Watters et al. | ................. | 717/121 |
| 2013/0174124 A1* | 7/2013 | Watters et al. | ................. | 717/122 |
| 2013/0205295 A1* | 8/2013 | Ebcioglu et al. | ................. | 718/1 |
| 2014/0053137 A1* | 2/2014 | Buehler et al. | ................ | 717/126 |
| 2014/0101641 A1* | 4/2014 | Staples et al. | ................. | 717/130 |

OTHER PUBLICATIONS

Dalle O et al: "Design considerations for M&S software", Winter Simulation Conference, Proceedings of the 2009, IEEE, Piscataway, NY, Dec. 13, 2009, pp. 944-955.
Search Report from EP Application No. 13180446.0 dated Oct. 20, 2013.

* cited by examiner

*Primary Examiner* — Don Wong
*Assistant Examiner* — Marina Lee
(74) *Attorney, Agent, or Firm* — General Electric Company; William S. Munnerlyn (57) ABSTRACT

A method for developing software in a parallel computing environment comprises the steps of developing a sequential implementation and parallel implementation of the software and verifying the results of the parallel implementation of the software against the results of the sequential implementation of the software.

9 Claims, 5 Drawing Sheets

METHOD FOR DEVELOPING SOFTWARE IN A PARALLEL COMPUTING ENVIRONMENT

BACKGROUND OF THE INVENTION

Software development processes have been developed to improve the productivity and quality of the software product over the entire lifecycle of the program. As personal and business computing processors have migrated from single core processing units (CPU) to multiple core CPUs and graphical processing units (GPU), computer software is being transitioning from being highly sequential to highly parallel.

Figure 1:
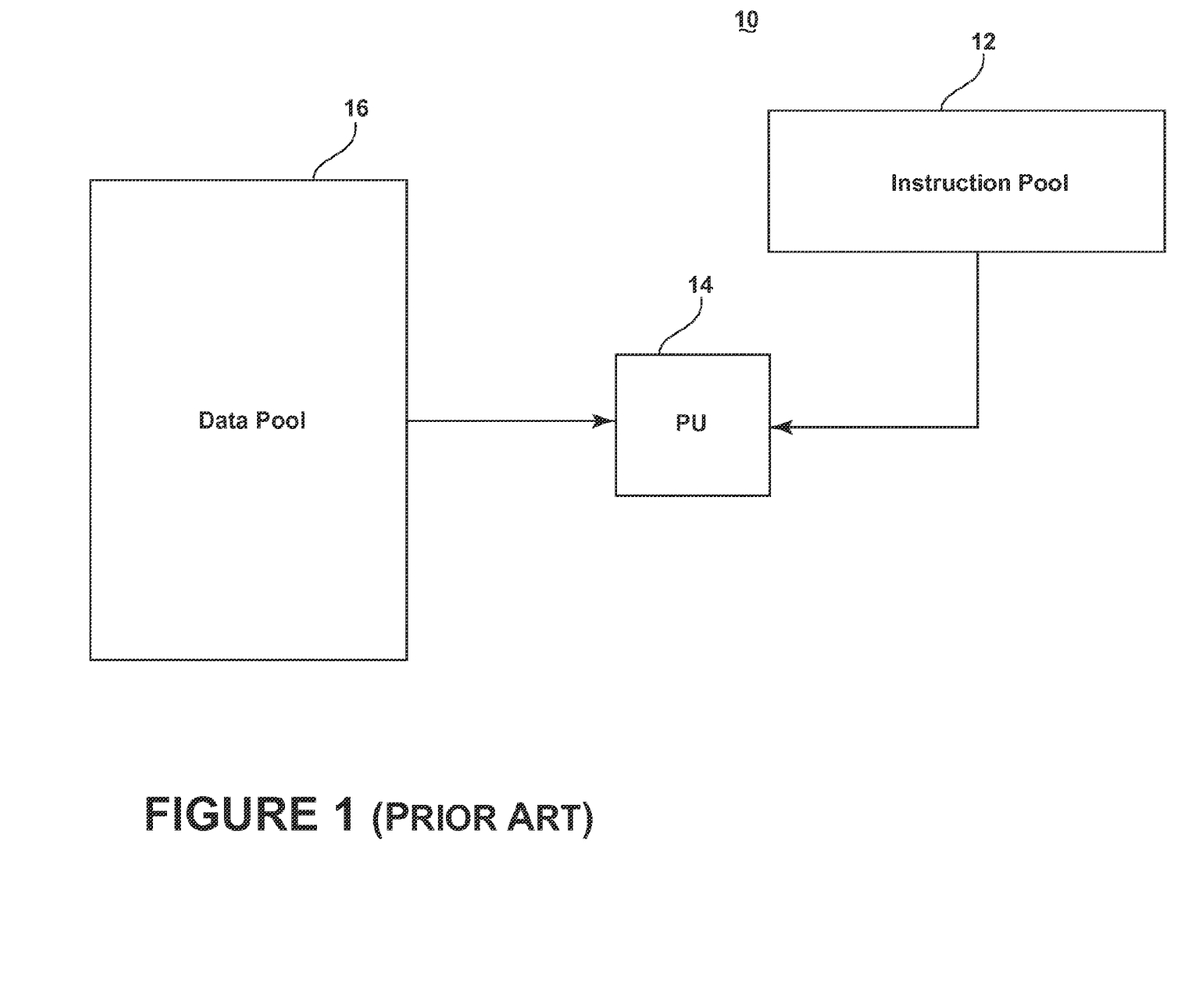
FIG. 1 is a schematic flowchart of a prior art sequential processing computer architecture with a single instruction stream and single data stream.

FIG. 1 is a schematic flowchart of a sequential processing computer architecture 10 with a single instruction stream and single data stream. Sequential processing refers to the execution of computer codes on a hardware architecture where a single processor executes a single stream of instructions from the instruction pool 12 to operate on data that is stored in memory in the data pool 16. The sequential implementation of the software that is programmed by the software developer resides in the instruction pool 12. A single serial stream of instructions is sent to a single processing unit (PU) 14 from the instruction pool 12 as the program is executed. The PU 14 receives data from the data pool 16 in a single serial stream. The representation of the sequential processing architecture 10 is referred to in the literature as an element of Flynn's taxonomy of computer architectures as single stream instruction, single stream data (SISD). The most well-known example of this architecture is the traditional single processor machines used in PCs through the 1980's and 1990's.

Figure 2:
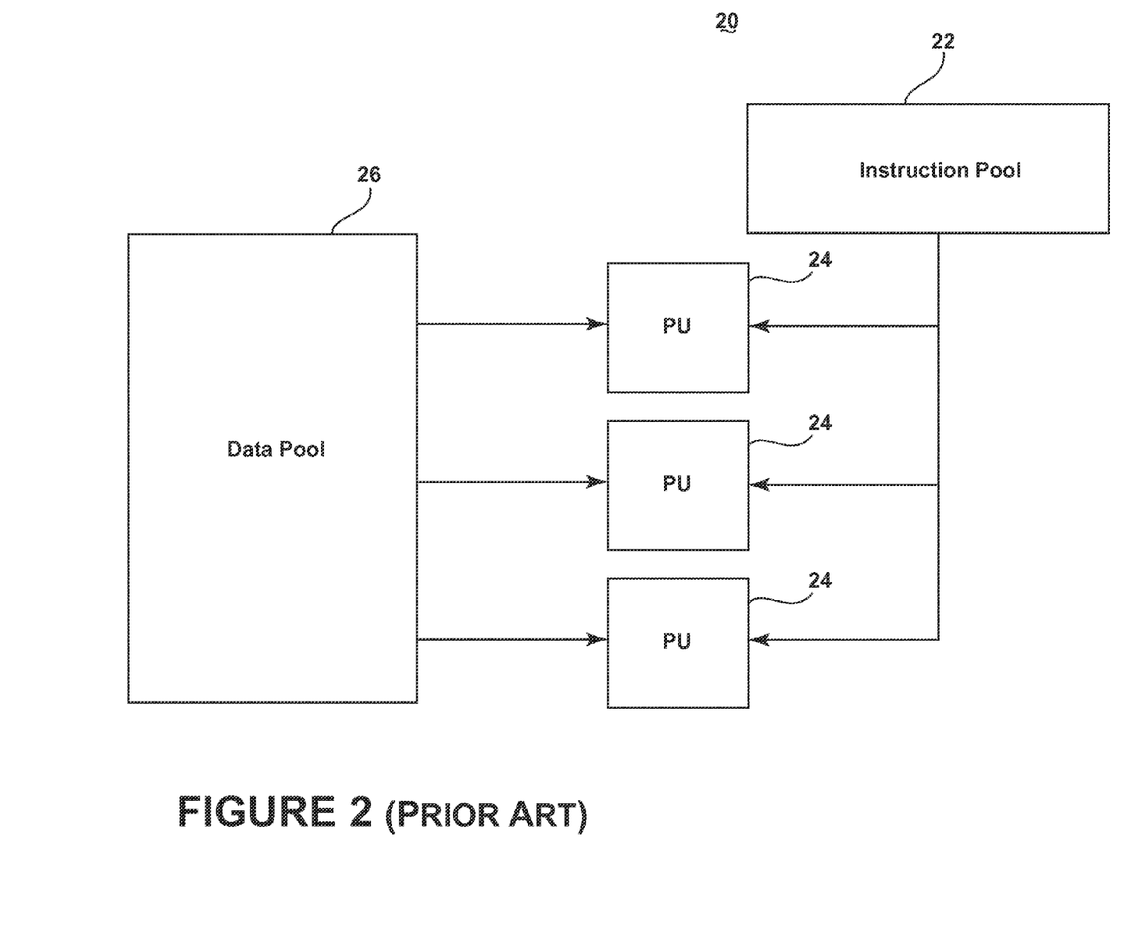
FIG. 2 is a schematic flowchart of a prior art parallel processing architecture with a single instruction stream and multiple data streams.

FIG. 2 is a schematic flowchart of a parallel processing computer architecture 20 with a single instruction stream and multiple data stream. Parallel processing refers to any computer architecture where distinct calculations can be carried out concurrently. In one parallel processing architecture, the execution of a parallel computer code occurs where multiple processors execute a single stream of instructions from the instruction pool 22 to operate on multiple streams of data that is stored in memory in the data pool 26. The parallel implementation of the software that is programmed by the software developer resides in the instruction pool 22. A single serial stream of instructions is sent to a set of processing units (PU) 24 from the instruction pool 22 as the program is executed. The PUs 24 each receive a stream of data from the data pool 26. This representation of the parallel processing architecture 20 is referred to in the literature as an element of Flynn's taxonomy of computer architectures as single stream instruction, multiple stream data (SIMD). The SIMD architecture is implemented in GPUs and most multi-core CPUs.

In a typical software development process, programmers pick a processing environment and develop for that selected environment. Consequently, a developer tasked with creating an application that will operate on a parallel computing platform will develop a parallel implementation of a software product on a parallel computing platform. Parallel implementations of computer programs are known to be more difficult to write than sequential implementations because the concurrency of computations adds the potential for additional types of software bugs and resource management issues. For example, parallel programs may suffer from a type of fault known as a race condition whereby a parallel implementation of a computer program exhibits anomalous behavior due to a critical dependence of timing between the operations performed by multiple processors. These types of errors can be extremely difficult to trace and, as a result, very time-consuming to fix.

Software development processes have been developed to improve the productivity and quality of the software product over the entire lifecycle of the program. Typically, these methodologies are built upon models of the software development lifecycle and provide a plan for the developer to follow as the computer program is developed and built. Due to the serial nature of computer hardware architecture that dominated the personal computer industry for decades, sequential processing has shaped the software development processes that computer scientists have used to develop computer code. The advent and accessibility of graphics processing units (GPUs) and multi-core central processing units (CPUs) has brought parallel computing to the mainstream of both business and personal computing. As a result, software development processes are inadequate and inefficient for the development and deployment of parallel software.

Figure 3:
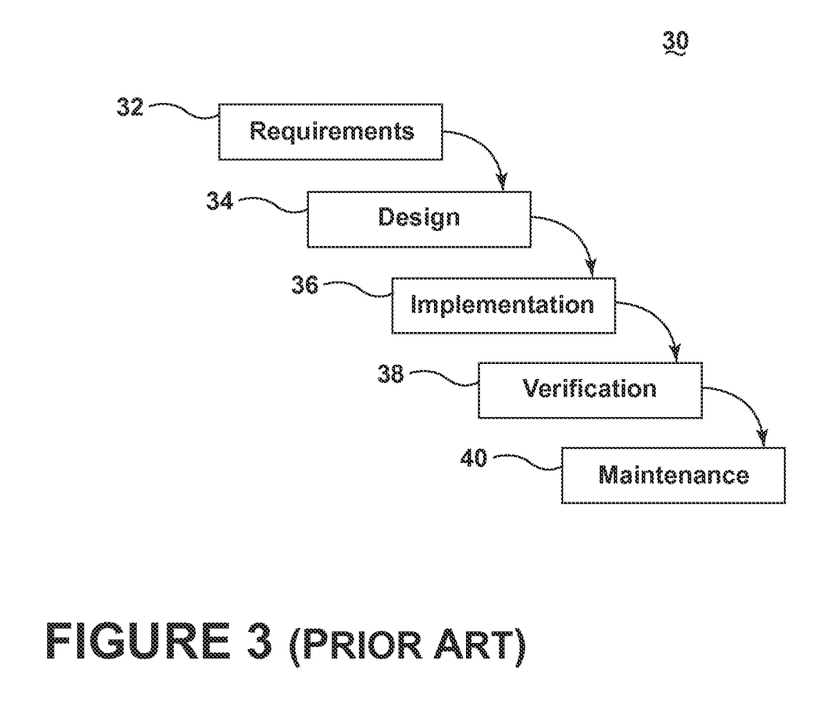
FIG. 3 is a schematic flowchart of a prior art sequential design process for software development known as the Waterfall model.

FIG. 3 is a schematic flowchart of the sequential design process for software development known as the Waterfall model 30. The Waterfall model 30 is a well-known design process that was adapted from hardware design methodology and used in software development where each phase of the process is completed before the next phase is begun. The phases of the Waterfall model 30 are requirements 32, design 34, implementation 36, verification 38 and maintenance 40. Each step is consecutively coupled to the next step so the overall development process progresses upon completion of the current step to the next step and is often visualized with preceding steps above the following steps so the progression is analogous to a waterfall.

The initial step of the Waterfall model 30 for software development is the requirements stage 32. The requirements stage 32 is consecutively coupled to the design stage 34; thus, the requirements stage 32 must be completed before the design stage 34 may commence. The design stage 34 is consecutively coupled to the implementation stage 36. The implementation stage 36 is consecutively coupled to the verification stage 38. The verification stage 38 is consecutively coupled to the maintenance stage 40. Upon completion of the maintenance stage 40, the development process is complete.

Typically the goal of the requirements stage 32 is to describe the purpose of the software and develop a software requirements specification. A software requirements specification is a complete description of a software system that defines both the functional and non-functional requirements of the software to be developed. The functional requirements for the software are the set of inputs, behaviors and outputs that describe how the software will work. The functional requirements are typically documented in the requirements stage 32 as calculations and use-cases. The non-functional requirements for the software describe qualities that the software will exhibit such as speed, stability, capacity and portability. The non-functional requirements are criteria that will dictate the system architecture.

The design stage 34 is a process of planning a specific software solution that will meet the purpose and requirements previously specified in the requirements stage 32. During the design stage 34, software developers will consider the functional and non-functional requirements and develop a software model that will detail the fundamental design of the software to be implemented. Typical considerations during software design are compatibility, modularity, reliability, usability, robustness, etc. The fundamental design of the software model will describe a hierarchy or framework that describes the software architecture. The software architecture will describe individual software components or modules and how the modules will interconnect. The output of the design stage 34 is documentation of the software model and may be a plain text description, a flowchart or a hierarchal description in a modeling language like Unified Modeling Language (UML).

The implementation stage 36 is the phase in the software development cycle where the computer code is actually written. The technical description from the design stage is realized as a software program or component. The program is intended to comply with the software requirements from the requirements stage 32 by being a direct implementation of the software design from the design stage 34.

The verification stage 38 of the software development cycle is the process where the implemented software is tested against the software requirements and design to substantiate that the program has been built correctly and to specification. Software verification is a methodical process where tests are written to validate that software performs as specified. If the software does not pass the validation tests, the program is debugged to find and reduce defects. Upon completion of the verification stage 38 of the Waterfall development process 30, the software is installed and maintained. The maintenance stage 40 of the software development process occurs after the software system has been installed on the end user platform. At this point, the end user will identify previously unknown bugs or performance issues. Typically, software systems developed under the Waterfall model 30 will begin to evolve as end users' software requirements change when using a fielded system. Therefore, the maintenance stage 40 is the phase where a software system migrates away from the software requirements and design developed under the Waterfall model 30 in response to dynamic needs of the end user.

BRIEF DESCRIPTION OF THE INVENTION

The invention relates to a method for developing software in a parallel computing environment. The method comprises the steps of developing a sequential implementation of the software in a sequential processing environment; verifying that the sequential implementation of the software works as expected; developing a parallel implementation of the sequential implementation of the software in a parallel processing environment; and verifying the results of the parallel implementation of the software against the results of the sequential implementation of the software.

DESCRIPTION OF EMBODIMENTS OF THE INVENTION

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include improving the efficiency of parallel processing application development. As well, the method improves on existing software and hardware debugging techniques by allowing for debugging options not otherwise available to a developer of applications on multiple hardware platforms, both sequential and parallel. Implementation of this technique on fielded platforms will improve the robustness of the system by automatically selecting the best run-time state of an application.

Figure 4:
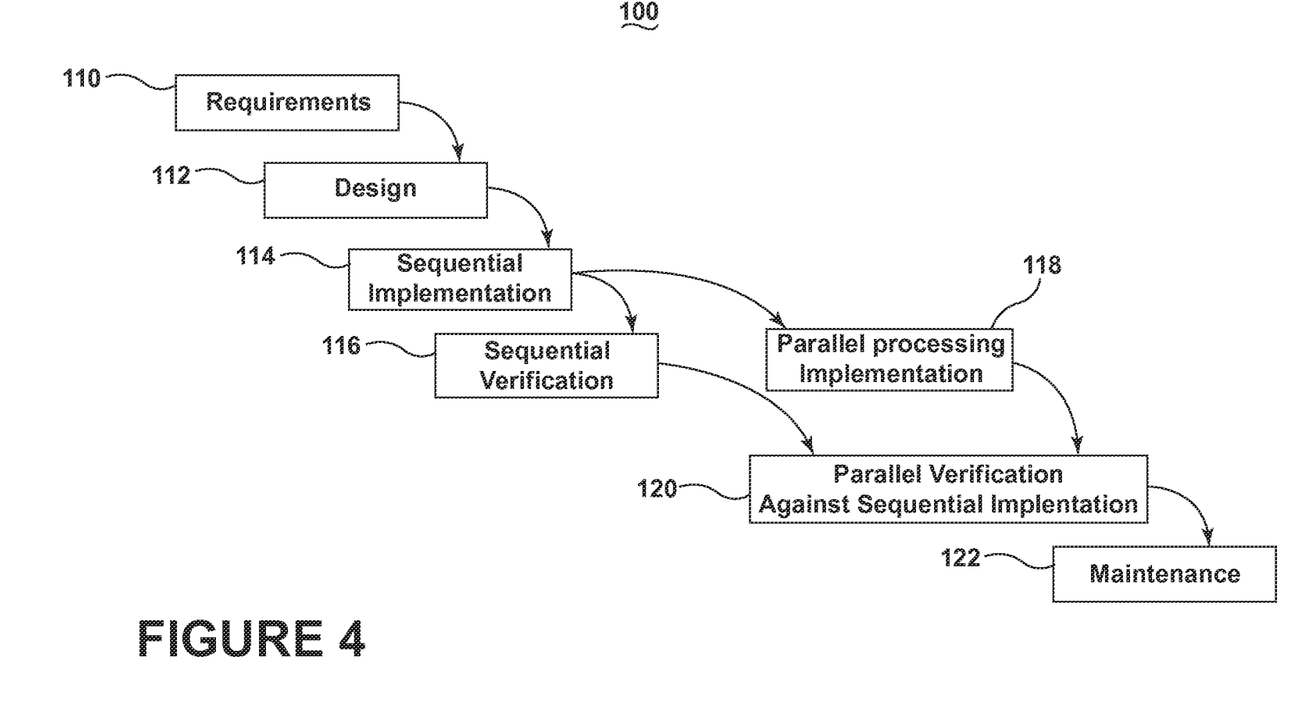
FIG. 4 is a schematic flowchart of the parallel design process for simultaneous development of sequential and parallel software according to an embodiment of the invention.

FIG. 4 illustrate a model 100 according to an embodiment of the invention in which the prior art Waterfall model 30 shown and described with respect to FIGS. 1-3 has been improved according to the illustrative examples provided herein. The model 100 is a software design process for developing software in a parallel computing environment. The development process augments the sequential design process known as the Waterfall model 30 that is typically used in sequential processing software development. The augmented phases demonstrate simultaneous development of a sequential and parallel implementation of a software program. The process then demonstrates a method to verify the parallel implementation against the sequential implementation.

The stages of the modified Waterfall model 100 are requirements 110, design 112, sequential implementation 114, sequential verification 116, parallel implementation 118, parallel verification against sequential implementation 120 and maintenance 122. The requirements stage 110 is consecutively coupled to the design stage 112. The design stage 112 is consecutively coupled to the sequential implementation stage 114. The sequential implementation stage 114 is then coupled to both the sequential verification 116 and parallel implementation stages 118. Both the sequential verification 116 and parallel implementation stages 118 are coupled to the parallel verification against sequential implementation stage 120. The parallel verification against sequential implementation stage 120 is consecutively coupled to the maintenance stage 122.

The requirements stage 110 of the modified Waterfall model 100 is implemented as in the requirements stage 32 of Waterfall model 30. In addition to the processes of the design stage 34 of the Waterfall model 30, the design stage 112 of the modified Waterfall model 100 includes additional perfunctory analysis by the developer to determine which, if any, sequential algorithms will be converted to parallel algorithms for parallel implementation. The analysis to determine which, if any, sequential algorithms will be converted to parallel algorithms for parallel implementation is limited in the design stage 112 because initial requirements from the requirements stage 110 and assumptions and requirements from the design stage 112 may change as the algorithms are implemented in computer code.

Upon completion of the design stage 112, the sequential implementation stage 114 is begun. The sequential implementation stage 114, like the implementation stage 36 of the Waterfall model 30, is the phase in the software development cycle where the computer code is actually written. The computer code developed in the sequential implementation stage 114 is a sequential implementation of the software that runs in a sequential processing environment. Non-functional requirements developed in the requirements stage 32 such as speed will not need to be met in the sequential implementation stage 114. In an alternative embodiment of the invention, the sequential and parallel algorithms each have a set of requirements and the sequential implementation should conform to the requirements noted for a sequential implementation. Upon completion of the sequential implementation stage 114, a more thorough analysis determines which sequential algorithms will stand to benefit most from parallelization.

The sequential verification stage 116 commences upon completion of the sequential implementation stage 114. Like the verification stage 38 of the Waterfall model 30, the goal of the sequential verification stage 116 is to verify that the sequential implementation of the software works as expected.

Contemporaneous to the sequential verification stage 116, the parallel implementation stage 118 may commence. The goal of the parallel implementation stage 118 is to develop a parallel implementation of the sequential implementation of the software in a parallel processing environment. The parallel processing environments may include mainstream hardware architectures such as multi-core CPUs and GPUs. Because even small changes in algorithmic implementation can result in substantial changes to a parallel implementation, the parallel processing implementation stage 118 should not be started until the sequential implementation stage 114 is concluded.

Upon completion of both the sequential verification 116 and the parallel implementation 118 stage, the parallel verification 120 stage may commence. The parallel verification stage 120 verifies the results of the parallel implementation of the software against the results of the sequential implementation of the software.

After the parallel implementation of the software has been verified in the parallel verification stage 120, the software development process of the modified Waterfall model 100 enters the maintenance stage 122. Like the maintenance stage 40 of the Waterfall model 30, the maintenance stage 122 of the modified Waterfall model 122 is the migration of the software project from the software development process to an evolutionary development whereby faults are discovered by the end-user and the incremental changes to the software occur in response to these faults and changes in end-user requirements.

Figure 5:
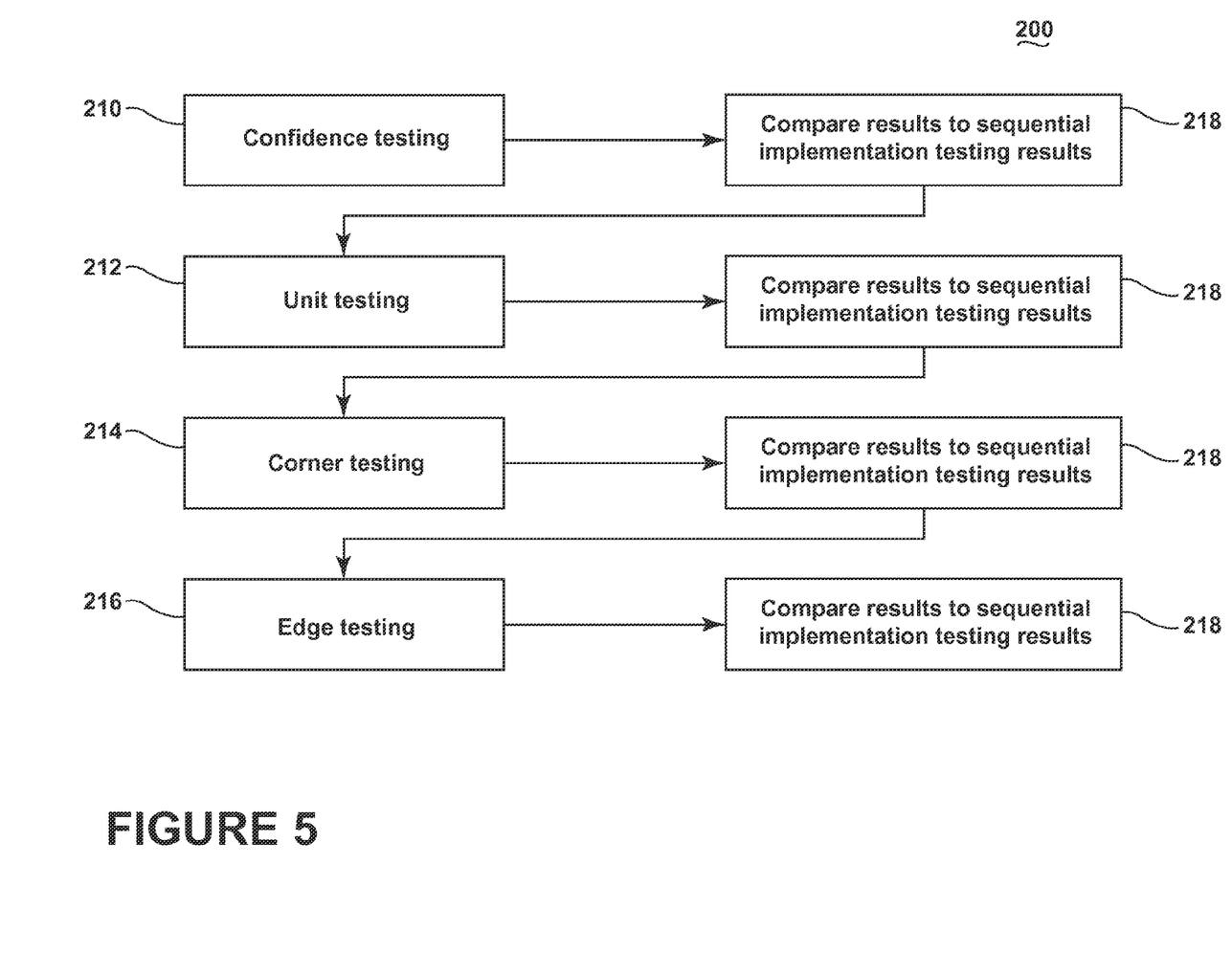
FIG. 5 is a schematic flowchart of the process used to verify the parallel code implementation against the sequential code implementation according to an embodiment of the invention.

FIG. 5 illustrates a process 200 that may be used to perform the parallel code verification stage 120 of the modified Waterfall model 100. In this process 200, to verify the parallel code implementation, a series of tests may be developed and performed by the software developer to compare the output and results to the previously verified sequential implementation of the software. The process may begin with confidence testing 210 of the parallel implementation. The results of the confidence testing may then be compared to the results of the sequential implementation 218. Upon successful comparison of the results, the process may continue with unit testing 212 of the parallel implementation. The results of the unit testing may then be compared to the results of the sequential implementation 218. Upon successful comparison of the results, the process may continue with corner testing 214 of the parallel implementation. The results of the corner testing may then be compared to the results of the sequential implementation 218. Upon successful comparison of results, the process may continue with edge testing 214 of the parallel implementation. The results of the edge testing may then be compared to the results of the sequential implementation 218.

Upon the start of the parallel implementation verification, the software developer may develop and perform confidence testing 210. Confidence testing is typically an informal method of testing meant to quickly verify overall functioning of a software implementation. Because a series of tests may have already been developed for the sequential implementation in the sequential verification stage 116, the results of the confidence testing 210 may be compared to the results for similar tests developed for the sequential verification stage 116.

After the results of the confidence testing have been verified against the results of the sequential implementation, the software developer may develop and perform unit testing 212. Unit testing is a method of testing software components that verifies the functionality of a specific section of software code. Because a series of unit tests may have already been developed for the sequential implementation in the sequential verification stage 116, the results of the unit testing 212 may be compared to the results for similar tests developed for the sequential verification stage 116.

After the results of the unit testing have been verified against the results of the sequential implementation, the software developer may develop and perform corner testing 214. Corner testing is a method of testing pathological cases where the software must handle inputs that only occur outside of normal operating parameters. Because a series of corner tests may have already been developed for the sequential implementation in the sequential verification stage 116, the results of the corner testing 214 may be compared to the results for similar tests developed for the sequential verification stage 116.

After the results of the corner testing have been verified against the results of the sequential implementation, the software developer may develop and perform edge testing 216. Edge testing is a method of testing pathological cases where the software must handle inputs where only a single parameter occurs outside of normal operating parameters. Because a series of edge tests may have already been developed for the sequential implementation in the sequential verification stage 116, the results of the edge testing 216 may be compared to the results for similar tests developed for the sequential verification stage 116.

To verify the results of the parallel implementation of the software against the results of the sequential implementation of the software, the software developer may perform confidence testing on the results of the parallel implementation of the software and compares the results to the results of the sequential implementation from sequential verification stage. Additionally, the developer will perform unit tests, corner tests and edge tests on the results of the parallel implementation of the software and compare the results to the results of the sequential implementation from the sequential verification stage.

Using the modified Waterfall method 100 as a parallel software development tool, the software developer can develop parallel implementations with more flexibility by allowing the developer to test parallel implementations confidently and quickly. As a software development tool, the modified Waterfall method 100 according to an embodiment of the present invention, allows for the automatic generation of multiple distinct parallel test scenarios upon completion of the sequential verification stage 116. Because confidence testing of parallel implementations is well-known to be difficult and time-consuming, the modified Waterfall method 100 according to an embodiment of the invention provides a quick and dependable way to vet results for a parallel implementation by comparing to previously vetted results from the sequential verification stage 116.

By developing software with the modified Waterfall method 100 as a parallel software development tool, performance testing and field debugging of hardware architectures for parallel processing is greatly enhanced. Toggling the deployed software between the parallel and sequential implementations allows for benchmarking of the hardware architecture. The sequential implementation provides a baseline evaluation of speed of the hardware. Using the sequential implementation benchmark, a developer can make informed comparisons of benchmarks of the parallel implementation across multiple different hardware architectures. For example, a developer or end user can swap in several different GPU cards into a hardware system and collect performance metrics for comparison. Additionally, the developer or end user can compare the performance metrics from the GPU cards and a hardware system integrated with a CPU.

Likewise, field debugging can be enhanced by developing software with the modified Waterfall method 100 because the developer can swap the sequential implementation of the software for the parallel implementation if an error occurs in the field. For example, a GPU fault could be isolated by running both the sequential and parallel code on the GPU with separate memory addressing chosen for the sequential code to isolate processing chains in the GPU. Toggling the implementation can be used to isolate the bug as a hardware or software fault. For example, a developer determines that a program works with a first hardware configuration but does not work with a second hardware configuration. By being able to toggle between the two configurations, the developer can quickly isolate the specific function and target location of the bug in the code.

Another benefit of the modified Waterfall method 100 as a parallel software development tool is for deployment of the software product. Because the development process results in both a parallel and sequential implementation of the software, an increase in platform robustness is achieved. The software development tool can be configured to detect whether a runtime state of the software can support a parallel processing implementation on the platform for which it has been deployed. For example, the software development tool may deploy the sequential implementation on a system with a single core CPU and the parallel implementation on a GPU-based system.

Another benefit of the modified Waterfall method 100 is the high level of reuse of the results of the requirements and verification stages prior to the sequential and parallel implementations. By not having to step through these stages individually for each resulting implementation, the developer can save time and more quickly develop functional implementations. Similarly, having one set of validation results to compare and verify both implementations is a time-saving benefit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for developing software in a parallel computing environment comprising the steps of:
    developing a sequential implementation of the software in a sequential processing environment using a sequential processing architecture;
    verifying that the sequential implementation of the software works as expected;
    developing a parallel implementation in a parallel processing environment using a parallel processing architecture following the completion of the sequential implementation of the software; and
    verifying the results including testing of the parallel implementation of the software following the step of verifying that the sequential implementation of the software works as expected; wherein the sequential processing architecture and the parallel processing architecture comprise different hardware architectures and wherein the sequential implementation of the software and the parallel implementation of the software are each designed for a corresponding one of the different hardware architectures.

2. The method for developing software according to claim 1 and further comprising the step of maintaining both the sequential implementation of the software and the parallel implementation of the software.

3. The method for developing software according to claim 1 and further comprising the steps of:
    determining requirements for the software; and
    determining a design for the software;
    wherein these steps are performed prior to the step of developing the software in the sequential processing environment.

4. The method for developing software according to claim 1 wherein the step of developing a parallel implementation of the sequential implementation of the software in a parallel processing environment is performed generally contemporaneously with the step of verifying that the sequential implementation of the software works as expected.

5. The method for developing software according to claim 1 wherein the parallel processing environment comprises at least one graphical processing unit (GPU) and the sequential processing environment comprises at least one central processing unit (CPU).

6. The method for developing software according to claim 1 wherein the parallel processing environment comprises at least one multi-core processor and the sequential processing environment comprises at least one central processing unit (CPU).

7. The method for developing software according to claim 1 wherein the step of verifying the results including testing of the parallel implementation of the software against the results including testing of the sequential implementation of the software comprises at least one of the following steps:
    (a) performing confidence testing on the results of the parallel implementation of the software and comparing the results to the results of the sequential implementation;
    (b) performing at least one unit test on the results of the parallel implementation of the software and comparing the results to the results of the sequential implementation;
    (c) performing at least one corner test on the results of the parallel implementation of the software and comparing the results to the results of the sequential implementation; and
    (d) performing at least one edge test on the results of the parallel implementation of the software and comparing the results to the results of the sequential implementation.

8. The method for developing software according to claim 1 and further comprising the step of detecting whether a run-time state of the software can support parallel processing.

9. The method for developing software according to claim 8 and further comprising the step of running the software in the parallel processing mode based upon a signal from the step of detecting whether a run-time state of the software can support parallel processing.

* * * * *

UNITED STATES PATENT AND TRADEMARK OFFICE
CERTIFICATE OF CORRECTION

PATENT NO. : 9,015,673 B2  
APPLICATION NO. : 13/588485  
DATED : April 21, 2015  
INVENTOR(S) : Buehler et al.

Page 1 of 1

It is certified that error appears in the above-identified patent and that said Letters Patent is hereby corrected as shown below:

On the Title Page, in the Figure, for Tag "120", in Line 2, delete "Implentation" and insert -- Implementation --, therefor.

In the Drawings

In Fig. 4, Sheet 4 of 5, for Tag "120", in Line 2, delete "Implentation" and insert -- Implementation --, therefor.

In the Specification

In Column 3, Line 63, delete "DESCRIPTION" and insert -- DETAILED DESCRIPTION --, therefor.

In Column 6, Line 55, delete "118 stage," and insert -- stage 118, --, therefor.

In Column 6, Line 65, delete "model 122" and insert -- model 100 --, therefor.

In Column 7, Line 23, delete "testing 214" and insert -- testing 216 --, therefor.

Signed and Sealed this  
First Day of March, 2016

Michelle K. Lee  
*Director of the United States Patent and Trademark Office*